(12) United States Patent
Wu

(10) Patent No.: US 10,685,791 B2
(45) Date of Patent: Jun. 16, 2020

(54) KEYSWITCH DEVICE AND KEYBOARD

(71) Applicant: Chicony Electronics Co., Ltd., New Taipei (TW)

(72) Inventor: Kuo-Nan Wu, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 0 days.

(21) Appl. No.: 15/985,724

(22) Filed: May 22, 2018

(65) Prior Publication Data

US 2019/0244769 A1    Aug. 8, 2019

(30) Foreign Application Priority Data

Feb. 5, 2018    (TW) .............................. 107104029 A

(51) Int. Cl.
| | |
|---|---|
| *H01H 3/12* | (2006.01) |
| *H01H 13/10* | (2006.01) |
| *H01H 13/705* | (2006.01) |
| *G06F 3/02* | (2006.01) |

(52) U.S. Cl.
CPC .......... *H01H 3/125* (2013.01); *G06F 3/0202* (2013.01); *H01H 13/10* (2013.01); *H01H 13/705* (2013.01)

(58) Field of Classification Search
CPC ...... H01H 3/125; H01H 13/10; H01H 13/705; H01H 13/7065

USPC .......................................................... 200/344
See application file for complete search history.

(56) References Cited

U.S. PATENT DOCUMENTS 7,183,512 B2 *  2/2007  Lee .................. H01H 3/125
                                                      200/344
8,853,580 B2   10/2014  Chen

FOREIGN PATENT DOCUMENTS

TW            201232590 A      8/2012

* cited by examiner

*Primary Examiner* — Edwin A. Leon
*Assistant Examiner* — Lheiren Mae A Caroc
(74) *Attorney, Agent, or Firm* — CKC & Partners Co., LLC

(57) ABSTRACT

A keyswitch device includes a base plate, a hook, a scissors-like linkage mechanism, a keycap, and a blocking structure. The hook is located on the base plate. The scissors-like linkage mechanism is located on the base plate and includes a connection member. The connection member includes a shaft rotatably engaged with the hook. The keycap is engaged with the scissors-like linkage mechanism and configured to move relative to the base plate with the guidance of the scissors-like linkage mechanism. The blocking structure is located on the base plate. When the keycap is located at a highest position relative to the base plate, the blocking structure and a part of the connection member abut against each other.

19 Claims, 6 Drawing Sheets

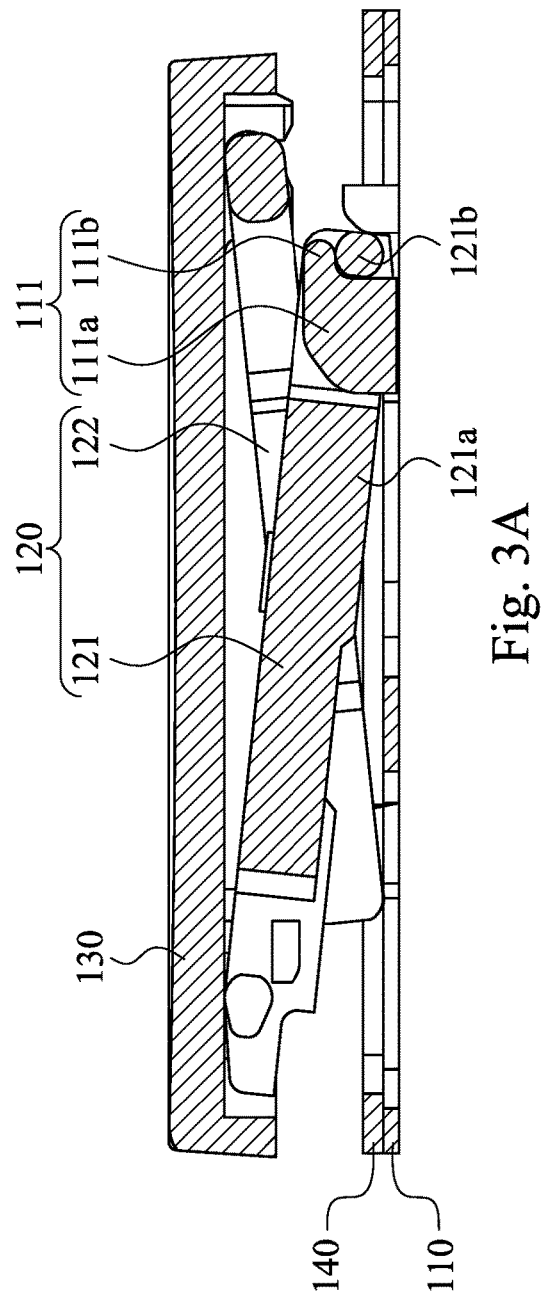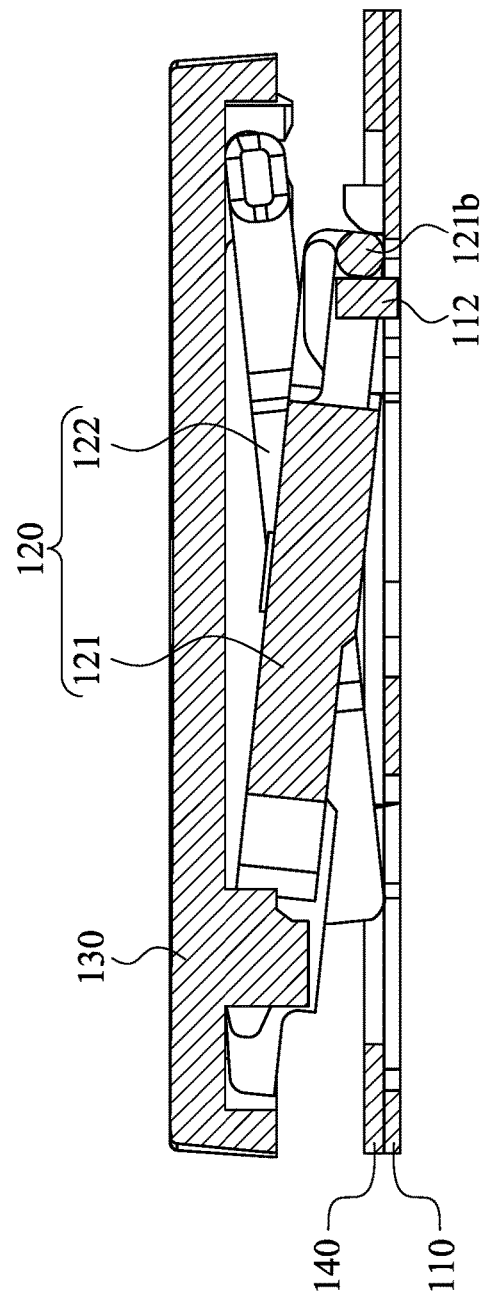
Fig. 3A
Fig. 3B

KEYSWITCH DEVICE AND KEYBOARD

CROSS-REFERENCE TO RELATED APPLICATION

This application claims priority to Taiwan Application Serial Number 107104029, filed Feb. 5, 2018, which is herein incorporated by reference.

BACKGROUND

Technical Field

The present disclosure relates to a keyswitch device and a keyboard.

Description of Related Art

Currently, the keyboard is one of the indispensable input devices to enter text or numbers while using a personal computer (PC). Moreover, consumer electronic products used in daily life or large-scale processing equipment used in the industrial sector require key structure units as input devices to be operated.

For keys of a keyswitch device, in order to balance the force applied onto each key by a user, each key is usually equipped with a linkage structure under its keycap for guiding the keycap to perform vertical movement. Therefore, no matter being applied close to an edge or a corner of the keycap, the force can be evenly distributed on the whole surface of the keycap, which makes it easy to press the key and lets the user to operate the key more easily. For example, a conventional scissors-like linkage structure is consisted of two connection members connected in an interlaced manner.

However, when the conventional scissors-like linkage structure is assembled to the hooks on the base plate, shafts of the scissors-like linkage structure are easily worn by the hooks. This situation often results in problems that the keyswitch device wobbles and malfunctions while operating at corners, and heights of the keycaps are different.

Accordingly, how to provide a keyswitch device and a keyboard to solve the aforementioned problems becomes an important issue to be solved by those in the industry.

SUMMARY

An aspect of the disclosure is to provide a keyswitch device and a keyboard to solve the aforementioned problems.

According to an embodiment of the disclosure, a keyswitch device includes a base plate, a hook, a scissors-like linkage mechanism, a keycap, and a blocking structure. The hook is located on the base plate. The scissors-like linkage mechanism is located on the base plate and includes a connection member. The connection member includes a shaft rotatably engaged with the hook. The keycap is engaged with the scissors-like linkage mechanism and configured to move relative to the base plate with the guidance of the scissors-like linkage mechanism. The blocking structure is located on the base plate. When the keycap is located at a highest position relative to the base plate, the blocking structure and a part of the connection member abut against each other.

In an embodiment of the disclosure, the blocking structure protrudes from the base plate toward the keycap.

In an embodiment of the disclosure, said part of the connection member is a portion of the shaft.

In an embodiment of the disclosure, the blocking structure is closer to an outer edge of the keycap than the hook in an axial direction of the shaft.

In an embodiment of the disclosure, the connection member further includes a rib connected to the shaft and located between the hook and the blocking structure.

In an embodiment of the disclosure, the blocking structure is a hole located on the base plate. Said portion of the shaft is a cam portion partially protruding into the hole.

In an embodiment of the disclosure, the connection member further includes a main body portion connected to the shaft. Said part of the connection member is an inner wall of a hole located on the main body portion. The blocking structure partially protrudes into the hole.

In an embodiment of the disclosure, the hook is closer to an outer edge of the keycap than the blocking structure in an axial direction of the shaft.

In an embodiment of the disclosure, the hook includes a first extending portion and a second extending portion. The first extending portion is connected to the base plate and extends toward the keycap. The second extending portion is connected to the first extending portion. The shaft is retained between the base plate and the second extending portion. When the blocking structure and said part of the connection member abut against each other, a smallest distance between the shaft and the first extending portion is equal to or greater than 0.

According to another embodiment of the disclosure, a keyboard includes a base plate, a plurality of hooks, and a plurality of keyswitch assemblies. The hooks are located on the base plate. The keyswitch assemblies are located on the base plate. One of the keyswitch assemblies includes a scissors-like linkage mechanism, a keycap, and a blocking structure. The scissors-like linkage mechanism includes a connection member. The connection member includes a shaft rotatably engaged with a corresponding hook of the hooks, wherein the corresponding hook corresponds the shaft. The keycap is engaged with the scissors-like linkage mechanism and configured to move relative to the base plate with the guidance of the scissors-like linkage mechanism. The blocking structure is located on the base plate. When the keycap is located at a highest position relative to the base plate, the blocking structure and a part of the connection member abut against each other.

Accordingly, in the keyswitch device and the keyboard of the present disclosure, the base plate is equipped with the blocking structure thereon, and the blocking structure is used to be abutted against by a part of one connection member of the scissors-like linkage mechanism when the keycap is located at the highest position relative to the base plate. Therefore, even if the shaft of the connection member of the scissors-like linkage mechanism is worn when the connection member is assembled to the base plate, the blocking structure can still block and retain the connection member, so as to eliminate wobbles that might occur due to the worn shaft of the connection member. As such, the blocking structure can make the keycap precisely maintain at the highest position relative to the base plate when the keycap is not pressed.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 3A is a cross-sectional view of the structure in FIG. 2A taken along line 3A-3A;

FIG. 3B is a cross-sectional view of the structure in FIG. 2A taken along line 3B-3B;

DETAILED DESCRIPTION

Figure 1:
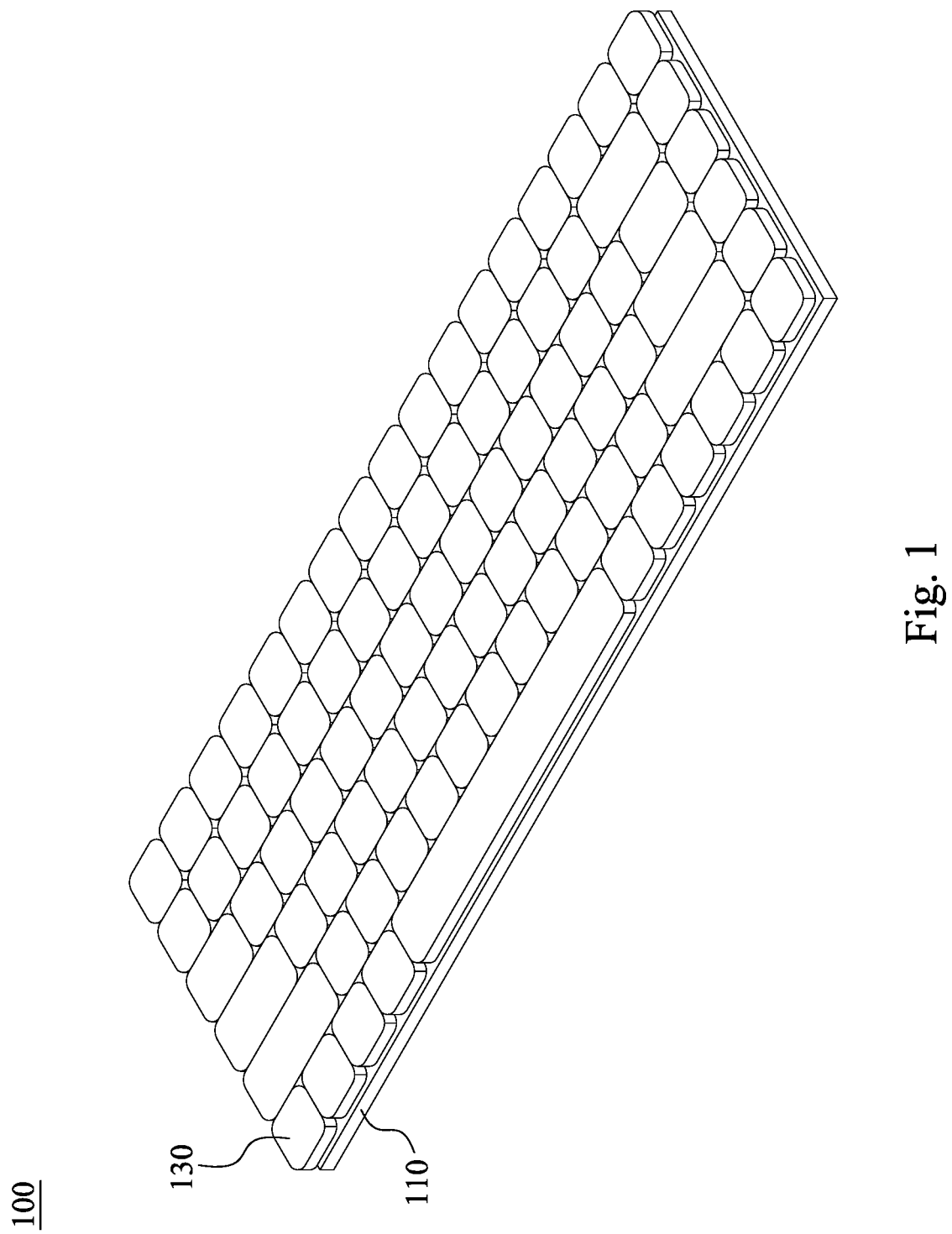
FIG. 1 is a perspective view of a keyboard according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing exemplary embodiments, and thus may be embodied in many alternate forms and should not be construed as limited to only exemplary embodiments set forth herein. Therefore, it should be understood that there is no intent to limit exemplary embodiments to the particular forms disclosed, but on the contrary, exemplary embodiments are to cover all modifications, equivalents, and alternatives falling within the scope of the disclosure.

Reference is made to FIG. 1. FIG. 1 is a perspective view of a keyboard 100 according to some embodiments of the disclosure. As shown in FIG. 1, the keyboard 100 of the disclosure can be an external keyboard (e.g., a keyboard with a PS/2 interface or a keyboard with a USB interface) used in a desktop computer, or can be a part of a computer system having an input device that is in the form of a keyboard (e.g., a notebook computer or a laptop computer), but the disclosure is not limited in this regard. That is, concepts of the keyboard 100 of the disclosure can be used in any electronic product that adopts keyswitch devices to be the input interface. The keyboard 100 shown in FIG. 1 includes a base plate 110 and a plurality of keycaps 130.

Figure 2A:
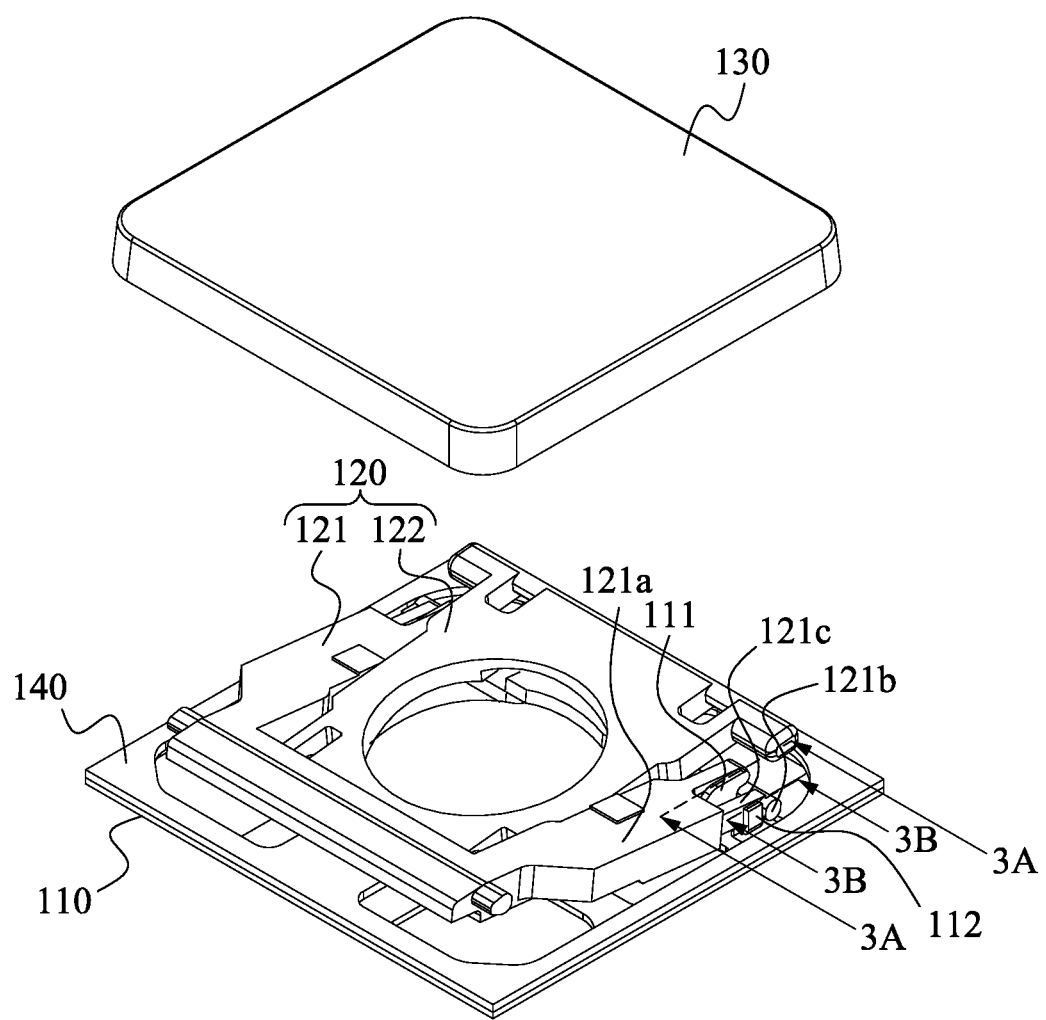
FIG. 2A is a partial perspective view of the keyboard in FIG. 1, in which a keycap and a scissors-like linkage mechanism are separated.

Reference is made to FIGS. 2A-3B. FIG. 2A is a partial perspective view of the keyboard 100 in FIG. 1, in which the keycap 130 and a scissors-like linkage mechanism 120 are separated. FIG. 2B is an exploded view of the structure in FIG. 2A. FIG. 3A is a cross-sectional view of the structure in FIG. 2A taken along line 3A-3A. FIG. 3B is a cross-sectional view of the structure in FIG. 2A taken along line 3B-3B. Structures and functions of components included in the keyboard 100 and connection and operation relationships among these components are described in detail below.

Figure 2B:
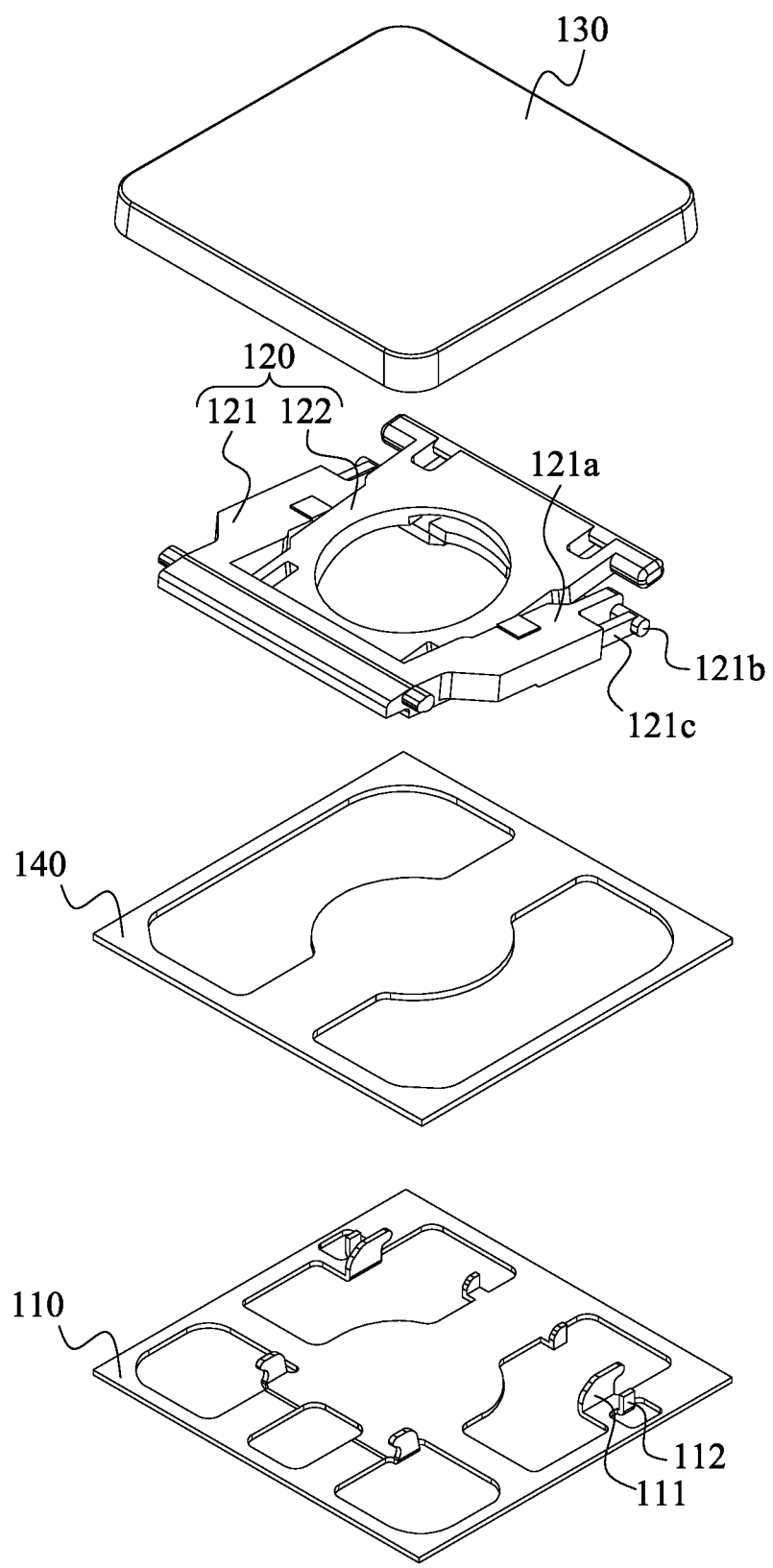
FIG. 2B is an exploded view of the structure in FIG. 2A.

As shown in FIGS. 2A and 2B, in the embodiment, the keyboard includes a base plate 110, a plurality of hooks 111 (only one of which is exemplarily labelled with reference number in each of FIGS. 2A and 2B), a plurality of keyswitch assemblies, and a circuit board 140. One of the keyswitch assemblies includes a scissors-like linkage mechanism 120, a keycap 130, and a blocking structure 112. In practical applications, the structural combination shown in FIG. 2A can be considered as an independent keyswitch device. The scissors-like linkage mechanism 120 includes a first connection member 121 and a second connection member 122. The first connection member 121 includes a main body portion 121a and a shaft 121b connected to each other. In the present embodiment, the main body portion 121a is frame-like, but the disclosure is not limited in this regard. The second connection member 122 is sleeved at an inner edge of the main body portion 121a of the first connection member 121, and an outer edge of the second connection member 122 is pivotally connected to the inner edge of the main body portion 121a, so the first connection member 121 and the second connection member 122 can act like a scissor. The shaft 121b of the first connection member 121 passes through the circuit board 140 to be rotatably engaged with the hook 111. The keycap 130 is engaged with the scissors-like linkage mechanism 120 and configured to move relative to the base plate 110 with the guidance of the scissors-like linkage mechanism 120. Approach of engaging the first connection member 121 with the keycap 130 and approaches of engaging the second connection member 122 with the base plate 110 and the keycap 130 respectively can be referred to conventional technology and do not be described in detail here. In addition, the blocking structure 112 is located on the base plate 110.

As shown in FIGS. 3A and 3B, in the embodiment, the blocking structure 112 protrudes from the base plate 110 toward the keycap 130. When the keycap 130 is located at a highest position relative to the base plate 110 (i.e., in the state that the keycap 130 is not pressed), the blocking structure 112 and a part of the first connection member 121 abut against each other. Specifically, in the embodiment, said part of the first connection member 121 (i.e., the part of the first connection member 121 abutting against the blocking structure 112) is a portion of the shaft 121b.

In detail, as shown in FIGS. 3A and 3B, the hook 111 includes a first extending portion 111a and a second extending portion 111b. The first extending portion 111a is connected to the base plate 110 and extends toward the keycap 130. The second extending portion 111b is connected to the first extending portion 111a. The shaft 121b is retained between the base plate 110 and the second extending portion 111b. When the blocking structure 112 and said portion of the shaft 121b abut against each other, a smallest distance between the shaft 121b and the first extending portion 111a is equal to 0. That is, when the keycap 130 is located at the highest position relative to the base plate 110, both the first extending portion 111a of the hook 111 and the blocking structure 112 contact the shaft 121b, but the disclosure is not limited in this regard.

In other embodiments, when the blocking structure 112 and said portion of the shaft 121b abut against each other, the smallest distance between the shaft 121b and the first extending portion 111a is greater than 0. That is, when the keycap 130 is located at the highest position relative to the base plate 110, the blocking structure 112 contacts the shaft 121b, but the first extending portion 111a of the hook 111 does not contact the shaft 121b.

With the foregoing structural configurations, even if the shaft 121b is worn when the first connection member 121 is assembled to the base plate 110, the blocking structure 112 can still block and retain the first connection member 121, so as to eliminate wobbles that might occur due to the worn shaft 121b of the first connection member 121. As such, the blocking structure 112 can make the keycap 130 precisely maintain at the highest position relative to the base plate 110 when the keycap 130 is not pressed.

As shown in FIGS. 2A and 2B, in the embodiment, the blocking structure 112 is closer to an outer edge of the keycap 130 than the hook 111 in an axial direction of the shaft 121b. In other words, the blocking structure 112 is located much outer relative to the keyswitch device than the hook 111. Because the shaft 121b is configured to be abutted against by the blocking structure 112 and the first extending portion 111a of the hook 111, the first connection member 121 further includes a rib 121c to further increase the structural strength of the shaft 121b. The rib 121c is connected between the main body portion 121a and the shaft 121b and located between the hook 111 and the blocking structure 112.

In the embodiment, each of the hook 111 and the blocking structure 112 is a part of the base plate 110. For example, the base plate 110 is a metal plate, and the hook 111 and the blocking structure 112 are portions bended from the base plate 110, but the disclosure is not limited in this regard. In other embodiments, the hook 111 and the blocking structure 112 can be components additionally disposed on the base plate 110.

Figure 4:
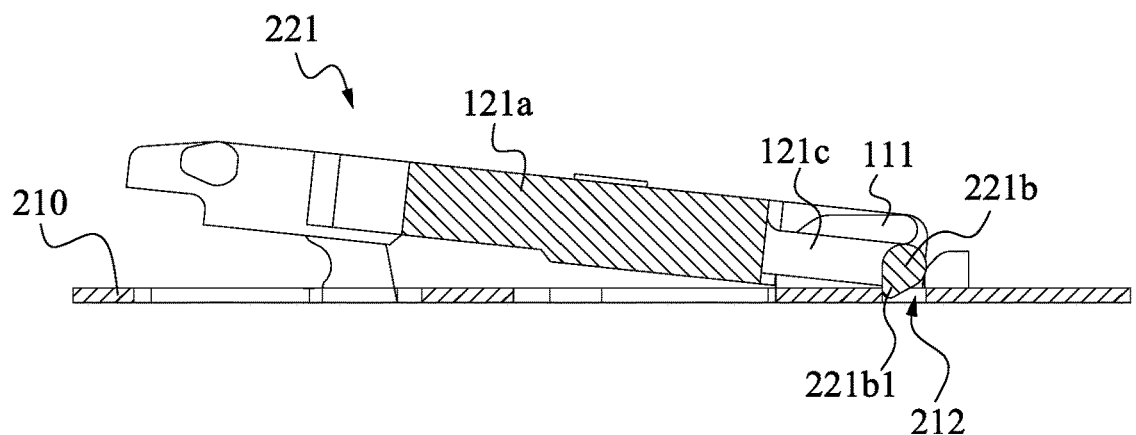
FIG. 4 is a cross-sectional view illustrating another embodiment of a base plate and a first connection member in FIG. 2A.
Figure 5:
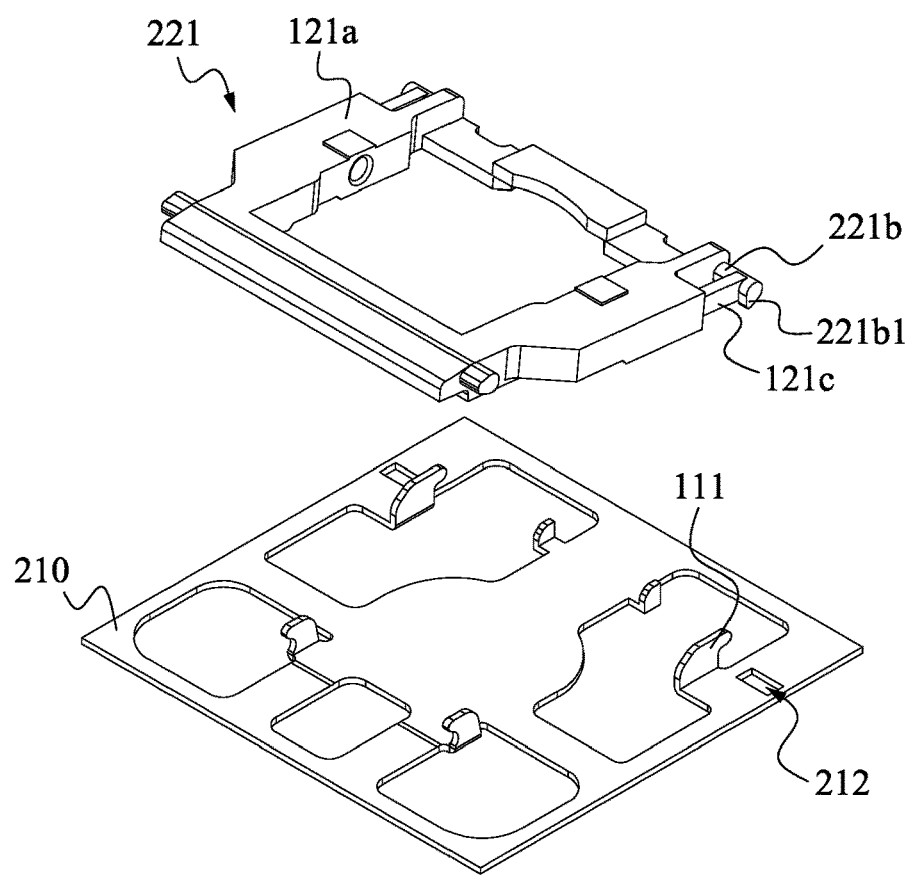
FIG. 5 is an exploded view of the base plate and the first connection member in FIG. 4.

Reference is made to FIGS. 4 and 5. FIG. 4 is a cross-sectional view illustrating another embodiment of the base plate 110 and the first connection member 121 in FIG. 2A. FIG. 5 is an exploded view of the base plate 210 and the first connection member 221 in FIG. 4.

As shown in FIGS. 4 and 5, differences between the present embodiment and the embodiment shown in FIG. 2A are that the blocking structure 212 of the present embodiment is a hole located on the base plate 210, and said portion of the shaft 221b of the first connection member 221 is a cam portion 221b1 partially protruding into the hole on the base plate 210. When the keycap 130 (also referred to FIG. 3B) is located at the highest position relative to the base plate 210, an inner edge of the blocking structure 212 (i.e., said hole) and the cam portion 221b1 of the shaft 221b abut against each other, so that the purpose of eliminating wobbles that might occur due to the worn shaft 221b of the first connection member 221 can also be achieved. As such, the blocking structure 212 shown in FIGS. 4 and 5 can also make the keycap 130 precisely maintain at the highest position relative to the base plate 210 when the keycap 130 is not pressed.

Figure 6:
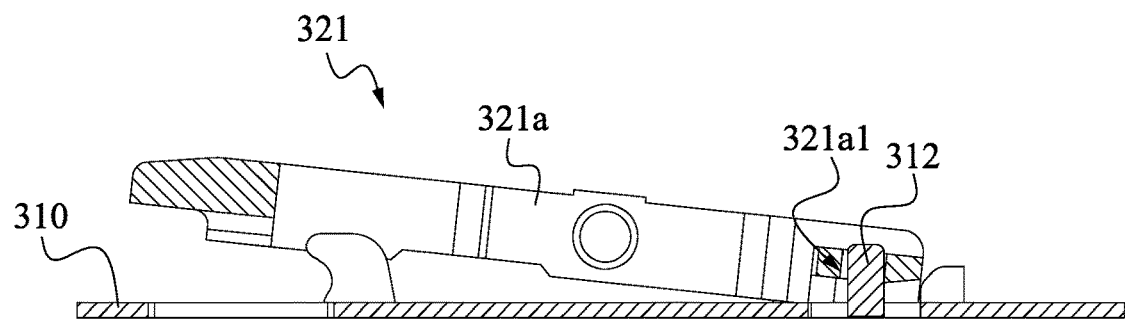
FIG. 6 is a cross-sectional view illustrating another embodiment of the base plate and the first connection member in FIG. 2A.
Figure 7:
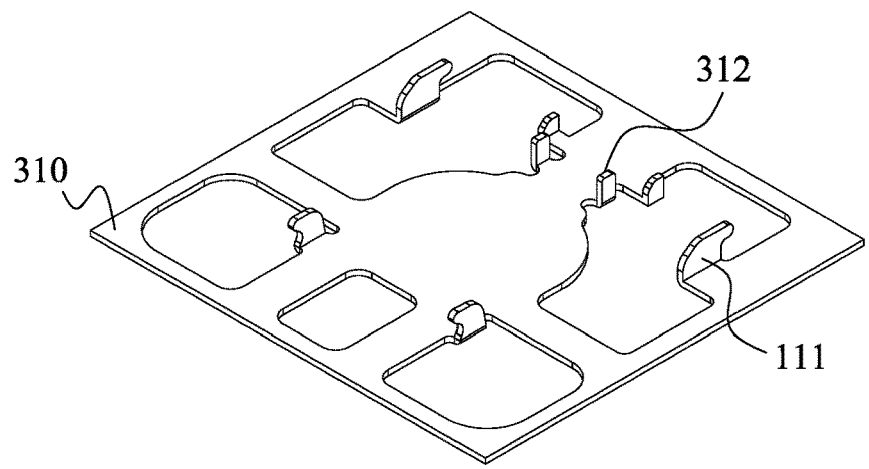
FIG. 7 is an exploded view of the base plate and the first connection member in FIG. 6.

Reference is made to FIGS. 6 and 7. FIG. 6 is a cross-sectional view illustrating another embodiment of the base plate 110 and the first connection member 121 in FIG. 2A. FIG. 7 is an exploded view of the base plate 310 and the first connection member 321 in FIG. 6.

As shown in FIGS. 6 and 7, a difference between the present embodiment and the embodiment shown in FIG. 2A is that the hook 111 on the base plate 310 is closer to an outer edge of the keycap 130 (also referred to FIG. 2A) than the blocking structure 312. Another difference between the present embodiment and the embodiment shown in FIG. 2A is that the main body portion 321a of the first connection member 321 has a hole 321a1, and the blocking structure 312 partially protrudes into the hole 321a1. When the keycap 130 (also referred to FIG. 3B) is located at the highest position relative to the base plate 310, the blocking structure 312 and the inner wall of the hole 321a1 of the main body portion 321a abut against each other, so that the purpose of eliminating wobbles that might occur due to the worn shaft 121b of the first connection member 321 can also be achieved. As such, the blocking structure 312 shown in FIGS. 6 and 7 can also make the keycap 130 precisely maintain at the highest position relative to the base plate 310 when the keycap 130 is not pressed.

In some other embodiments, the hole 321a1 on the main body portion 321a can be omitted or cancelled, and the position of the blocking structure 312 on the base plate 310 is adjusted to make the blocking structure 312 be able to abut against the inner edge of the frame-like main body portion 321a (the second connection member 122 is sleeved at the inner side of the main body portion 321a), such that the purpose of eliminating wobbles that might occur due to the worn shaft 121b of the first connection member 321 can also be achieved.

In some other embodiments, the first connection member 121 illustrated in FIGS. 2A and 2B may not include the rib 121c connected between the main body portion 121a and the shaft 121b. The first connection member 221 illustrated in FIGS. 4 and 5 may not include the rib 121c connected between the main body portion 121a and the shaft 221b. The first connection member 321 illustrated in FIGS. 6 and 7 may not include the rib connected between the main body portion 321a and the shaft 121b.

According to the foregoing recitations of the embodiments of the disclosure, it can be seen that in the keyswitch device and the keyboard of the present disclosure, the base plate is equipped with the blocking structure thereon, and the blocking structure is used to be abutted against by a part of one connection member of the scissors-like linkage mechanism when the keycap is located at the highest position relative to the base plate. Therefore, even if the shaft of the connection member of the scissors-like linkage mechanism is worn when the connection member is assembled to the base plate, the blocking structure can still block and retain the connection member, so as to eliminate an additional stroke and wobbles that might occur due to the worn shaft of the connection member. As such, the blocking structure can make the keycap precisely maintain at the highest position relative to the base plate when the keycap is not pressed.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A keyswitch device, comprising:
   a base plate;
   a hook located on the base plate;
   a scissors-like linkage mechanism located on the base plate and comprising a connection member, the connection member comprising a shaft rotatably engaged with the hook;
   a keycap engaged with the scissors-like linkage mechanism and configured to move relative to the base plate with guidance of the scissors-like linkage mechanism; and
   a blocking structure located on the base plate, wherein when the keycap is located at a highest position relative to the base plate, the blocking structure has a portion abutting against and being in physical contact with a part of the connection member, and the portion of the blocking structure and the hook are located at an identical side of the part of the connection member.

2. The keyswitch device of claim 1, wherein the blocking structure protrudes from the base plate toward the keycap.

3. The keyswitch device of claim 1, wherein said part of the connection member is a portion of the shaft.

4. The keyswitch device of claim 3, wherein:
the keycap comprises two first bottom edges closest to the base plate and extending substantially along an axial direction of the shaft, and two second bottom edges closest to the base plate and extending substantially perpendicular to the first bottom edges;
the blocking structure and the hook are in closer proximity to one of the second bottom edges than to the other of the second bottom edges, and the blocking structure is closer to said one of the second bottom edges than the hook.

5. The keyswitch device of claim 3, wherein the connection member further comprises a rib connected to the shaft and located between the hook and the blocking structure, wherein the rib has a length that extends in a direction substantially perpendicular to an axial direction of the shaft.

6. The keyswitch device of claim 5, wherein the connection member comprises a main body portion, and the shaft has a proximal end connected to the main body portion, and a distal end opposite the proximal end, wherein the rib extends from the main body portion to the shaft to be connected to the shaft at a location between the proximal end and the distal end of the shaft.

7. The keyswitch device of claim 3, wherein the blocking structure is an inner wall of a hole located on the base plate, and said portion of the shaft is a cam portion partially protruding into the hole.

8. The keyswitch device of claim 1, wherein the connection member further comprises a main body portion connected to the shaft, said part of the connection member is an inner wall of a hole located on the main body portion, and the blocking structure partially protrudes into the hole.

9. The keyswitch device of claim 8, wherein the hook is closer to an outer edge of the keycap than the blocking structure in an axial direction of the shaft.

10. The keyswitch device of claim 1, wherein the hook comprises:
a first extending portion connected to the base plate and extending toward the keycap; and
a second extending portion connected to the first extending portion, wherein the shaft is retained between the base plate and the second extending portion,
wherein when the blocking structure and said part of the connection member abut against each other, a smallest distance between the shaft and the first extending portion is equal to or greater than 0.

11. A keyboard, comprising:
a base plate;
a plurality of hooks located on the base plate; and
a plurality of keyswitch assemblies located on the base plate, one of the keyswitch assemblies comprising:
a scissors-like linkage mechanism comprising a connection member, the connection member comprising a shaft rotatably engaged with a corresponding one of the hooks;
a keycap engaged with the scissors-like linkage mechanism and configured to move relative to the base plate with guidance of the scissors-like linkage mechanism; and
a blocking structure located on the base plate, wherein when the keycap is located at a highest position relative to the base plate, the blocking structure has a portion abutting against and being in physical contact with a part of the connection member, and the portion of the blocking structure and the hook are located at an identical side of the part of the connection member.

12. The keyboard of claim 11, wherein the blocking structure protrudes from the base plate toward the keycap.

13. The keyboard of claim 11, wherein said part of the connection member is a portion of the shaft.

14. The keyboard of claim 13, wherein the blocking structure is closer to an outer edge of the keycap than said corresponding one of the hooks in an axial direction of the shaft.

15. The keyboard of claim 13, wherein the connection member further comprises a rib connected to the shaft and located between said corresponding one of the hooks and the blocking structure.

16. The keyboard of claim 13, wherein the blocking structure is an inner wall of a hole located on the base plate, and said portion of the shaft is a cam portion partially protruding into the hole.

17. The keyboard of claim 11, wherein the connection member further comprises a main body portion connected to the shaft, said part of the connection member is an inner wall of a hole located on the main body portion, and the blocking structure partially protrudes into the hole.

18. The keyboard of claim 17, wherein said corresponding one of the hooks is closer to an outer edge of the keycap than the blocking structure in an axial direction of the shaft.

19. The keyboard of claim 11, wherein said corresponding one of the hooks comprises:
a first extending portion connected to the base plate and extending toward the keycap; and
a second extending portion connected to the first extending portion, wherein the shaft is retained between the base plate and the second extending portion,
wherein when the blocking structure and said part of the connection member abut against each other, a smallest distance between the shaft and the first extending portion is equal to or greater than 0.

* * * * *